United States Patent
Yeh

(10) Patent No.: US 8,296,501 B2
(45) Date of Patent: Oct. 23, 2012

(54) MEMORY MANAGEMENT METHOD FOR NON-VOLATILE MEMORY AND CONTROLLER USING THE SAME

(75) Inventor: Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 579 days.

(21) Appl. No.: 12/178,827

(22) Filed: Jul. 24, 2008

(65) Prior Publication Data

US 2009/0307412 A1    Dec. 10, 2009

(30) Foreign Application Priority Data

Jun. 6, 2008  (TW) ................................ 97121270 A

(51) Int. Cl.
*G06F 12/00*    (2006.01)
(52) U.S. Cl. ........ 711/103; 711/151; 711/158; 711/165; 711/E12.008; 714/746; 714/758
(58) Field of Classification Search .................. 711/103, 711/151, 158, 165, E12.008; 714/746, 758
See application file for complete search history.

(56) References Cited

U.S. PATENT DOCUMENTS

| | | | |
|---|---|---|---|
| 8,051,339 B2 * | 11/2011 | Sung et al. | ..... 714/710 |
| 2008/0147998 A1 | 6/2008 | Jeong | |
| 2009/0193174 A1 * | 7/2009 | Reid | ..... 711/100 |

FOREIGN PATENT DOCUMENTS

| | | |
|---|---|---|
| CN | 1949194 | 4/2007 |
| CN | 101494085 | 7/2009 |

OTHER PUBLICATIONS

Chinese First Examination Report of China Application No. 200810129032.6 dated Jul. 19, 2011.
"Second Office Action of China Counterpart Application", issued on Jan. 13, 2012, p. 1-p. 6, in which the listed references were cited.

* cited by examiner

*Primary Examiner* — Jasmine Song
(74) *Attorney, Agent, or Firm* — J.C. Patents

(57) ABSTRACT

A memory management method for a non-volatile memory and a controller using the same are provided. The non-volatile memory is substantially divided into a plurality of blocks. First, non-erasing information of a plurality of memory units comprising at least one block is recoded and used as a reference to establish an evaluation value. Then, whether to move data of at least one block on the memory units to another memory unit according to the evaluation value is determined. Accordingly, problems of read disturb and data retention due to excessive reading times can be resolved.

16 Claims, 2 Drawing Sheets

MEMORY MANAGEMENT METHOD FOR NON-VOLATILE MEMORY AND CONTROLLER USING THE SAME

CROSS-REFERENCE TO RELATED APPLICATION

This application claims the priority benefit of Taiwan application serial no. 97121270, filed on Jun. 6, 2008. The entirety of the above-mentioned patent application is hereby incorporated by reference herein and made a part of specification.

BACKGROUND OF THE INVENTION

1. Field of the Invention

The present invention relates to a memory management method and a controller thereof. More particularly, the present invention relates to a memory management method for a non-volatile memory and a controller using the same.

2. Description of Related Art

With a quick developing of digital camera, cell phone camera and MP3, demand of storage media by customers is increased greatly. Since a flash memory has the advantages of non-volatile, energy saving, small size and none mechanical structure etc., it is suitable for portable applications, and especially for portable electronic products. Besides a demand of built-in memories of the portable electronic products, demand of the flash memories used for external products such as small memory cards and flash drives is increased greatly in the market since a user may simultaneously own a plurality of the small memory cards and the flash drives. Therefore, the flash drive industry becomes a hot industry within the electronics industry recently.

Though the flash drive has the advantages of programmable, erasable, data saving after power-off, erase times of blocks within the flash memory are limited. For example, the blocks in the flash memory may be worn after being erased 10,000 times. Data loss may be caused when the storage capacity or performance of a flash memory is obviously deteriorated by its worn-out blocks.

Wear of the flash memory blocks is determined by the number of times this block is programmed or erased. In other words, the wear of a block is relatively low if the block is programmed (or written) only once; contrarily, the wear of a block is relatively higher if the block is programmed and erased repeatedly. For example, when a host keeps writing data into a flash memory by using the same logical block address (LBA), the block having the corresponding physical block address (PBA) in the flash memory is then repeatedly written and erased.

Generally speaking, the existence of worn-out blocks will reduce the performance of a flash memory even if the wear of other blocks are still relatively low. Besides the deterioration in the performance of the worn-out blocks, the performance of the entire flash memory is also reduced when the good blocks cannot provide enough space for storing data. In other words, when the number of worn-out blocks in a flash memory exceeds a threshold value, the flash memory is considered unusable even there are still good blocks. In this case, those good blocks are wasted.

To prolong a lifespan of the flash memory, utilization of the blocks of the flash memory should be levelled. Generally, the blocks of the flash memory are grouped into a data area and a spare area. According to a conventional wear leveling method, when the flash memory is operated for a period of time, the blocks within the data area and the blocks within the spare area are logically exchanged sequentially, hopefully the blocks with lesser erase times may be exchanged to the data area for being programmed (or written).

When a wear leveling procedure is executed, the data block is selected according to the erase times of the block, so as to exchange data. However, an influence caused by block reading is not considered based on such selecting method. As cost of the flash memory decreases, performance and stability of a flash memory chip are influenced, so that not only the lifespan of the flash memory is limited by writing times thereof, excessive reading times thereof may also cause a read disturb problem, and data left unused for too long time may cause a data retention problem. Such problems become more serious as the stability of the flash memory decreases.

Accordingly, a memory management method is required to effectively prolong the lifespan of the flash memory.

SUMMARY OF THE INVENTION

Accordingly, the present invention is directed to a memory management method for a non-volatile memory, in which by adding a data moving judgement criteria based on a time sequence for writing data into each block, data loss of blocks due to the blocks not being written for a long time can be avoided.

The present invention is directed to a controller, which may move blocks with relatively more correcting bit number of error correction code (ECC) in priority, so as to avoid data loss caused by reading error of the blocks.

The present invention provides a memory management method for a non-volatile memory, in which the non-volatile memory is substantially divided into a plurality of blocks. The method includes following steps: (a) recording non-erasing information of a plurality of memory units, in which the memory unit comprises at least one block. (b) establishing an evaluation value with reference of the non-erasing information, and determining whether to move data of at least one block on the memory units to another memory unit according to the evaluation value.

In an embodiment of the present invention, the non-erasing information includes one of utilization sequence, corrected bit number of the ECC, reading times, utilization time and idle time of the block.

In an embodiment of the present invention, the memory unit is a single block.

In an embodiment of the present invention, in the step (b), the utilization sequence of the blocks is weighted to the erasing times to serve as the evaluation value.

In an embodiment of the present invention, the memory unit is a group containing a plurality of the blocks.

In an embodiment of the present invention, in the step (b), the utilization sequence of the groups is weighted to the erasing times to serve as the evaluation value.

In an embodiment of the present invention, in the step (b), the corrected bit number of the ECC of the blocks is weighted to the erasing times to serve as the evaluation value.

In an embodiment of the present invention, in the step (b), the idle time of the blocks is weighted to the erasing times to serve as the evaluation value.

In an embodiment of the present invention, the step (b) includes judging whether the idle time of the memory units from a latest writing operation to the present exceeds a predetermined time, and moving data on the memory units to another memory unit if the idle time exceeds the predetermined time.

In an embodiment of the present invention, the step (b) includes calculating the idle time of the blocks from the latest writing operation to the present, and assigning a weight value to each of the groups for weighting the erasing times to serve as the evaluation value.

In an embodiment of the present invention, the step (b) is executed when the non-volatile memory is judged to be ever power-off.

In an embodiment of the present invention, a unit used for moving data of the blocks is a page.

In an embodiment of the present invention, the method further includes copying data of the blocks to a register, and copying the data from the register to other blocks before a host instruction is received.

In an embodiment of the present invention, the method further includes copying data of the blocks to a register, and copying the data of the blocks from original blocks to other blocks before a host instruction is received.

In an embodiment of the present invention, the step (b) includes calculating a corrected bit number of an ECC generated when each of the blocks is read, and judging whether the corrected bit number of the ECC exceeds a first threshold value, in which if the corrected bit number of the ECC exceeds the first threshold value, the corresponding block is marked or weighted, and when the data of these blocks is moved next time, this block is selected in priority for data moving.

In an embodiment of the present invention, the non-volatile memory includes a flash memory.

The present invention provides a controller including a micro-processing unit, a host link interface, a memory link interface and a memory management module. The micro-processing unit is used for controlling whole operations of the controller. The host link interface is coupled to a host and the micro-processing unit. The memory link interface is coupled to a non-volatile memory and the micro-processing unit, in which the non-volatile memory is substantially divided into a plurality of blocks. The memory management module is coupled to the micro-processing unit for executing a wear leveling procedure to the non-volatile memory via the micro-processing unit. The memory management module records non-erasing information of a plurality of memory units within the non-volatile memory that comprises at least one block, and establishes an evaluation value with reference of the non-erasing information, and determines whether to move data of at least one block on the memory units to another memory unit according to the evaluation value.

In an embodiment of the present invention, the controller further includes a storage unit for temporarily storing data of the memory units, and moving the data of the memory units to another memory unit before receiving a host instruction.

In an embodiment of the present invention, the non-erasing information includes one of utilization sequence, corrected bit number of the ECC, reading times, utilization time and idle time of the block.

In an embodiment of the present invention, the memory unit is a single block.

In an embodiment of the present invention, when the non-erasing information reaches a threshold value, data on the memory units is forced to be move to another memory unit.

In an embodiment of the present invention, the memory management module takes the utilization sequence of the blocks weighting erasing times of the block as the evaluation value.

In an embodiment of the present invention, the memory unit is a group containing a plurality of the blocks.

In an embodiment of the present invention, the memory management module takes utilization sequence of the groups weighting the erasing times as the evaluation value.

In an embodiment of the present invention, the memory management module takes the corrected bit number of the ECC of the blocks weighting the erasing times as the evaluation value.

In an embodiment of the present invention, the memory management module takes the idle time of the blocks weighting the erasing times as the evaluation value.

In an embodiment of the present invention, the memory management module judges whether an idle time of the memory units from a latest writing operation to the present exceeds a predetermined time, and moves data of the memory units to another memory unit if the idle time exceeds the predetermined time.

In an embodiment of the present invention, the memory management module counts an idle time of the groups from the latest writing operation to the present, and assigns a weight value to each of the groups for weighting the erasing times to serve as the evaluation value.

In an embodiment of the present invention, the memory management module moves data of the blocks to other blocks when the non-volatile memory is judged to be ever power-off.

In an embodiment of the present invention, the memory management module calculates a corrected bit number of an ECC generated when each of the blocks is read, and judges whether the corrected bit number of the ECC exceeds a first threshold value, in which if the corrected bit number of the ECC exceeds the first threshold value, the corresponding block is marked or weighted, and when the data of the blocks are moved next time, the block is selected in priority for data moving.

In an embodiment of the present invention, the non-volatile memory includes a flash memory.

In the present invention, the utilization sequence, the corrected bit number of the ECC, the reading times, the utilization time and the idle time of the blocks are recorded, and during the wear leveling procedure, besides a factor of erasing times of the blocks, an additional judgement of the non-erasing information is added, so as to effectively avoid data loss of blocks due to the blocks being not written for a long time. Moreover, the corrected bit number of the ECC generated during data reading is recorded, and is weighted to the erasing times to serve as a data moving sequence, so as to resolve the problems of read disturb and data retention.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Generally, a controller performs data moving according to writing or erasing times of a block. Though, to resolve a read disturb and a data retention problem, the present invention provides a method for adding non-erasing information such as utilization sequence, corrected bit number of the ECC, reading times, utilization time and/or idle time, etc. to a data moving judgement criteria, and records the non-erasing information of each block within the controller, so that when a wear leveling procedure is executed, besides the erasing times of a certain block can be used as a reference, the unique non-erasing information or both of the above two information can also be used for determining the data of which block is required to be moved to another block, so as to prolong a lifespan of a non-volatile memory and avoid loss of some data stored in the non-volatile memory due to not being written for a, long time. Accordingly, the present invention provides a memory management method for managing the non-volatile memory and a controller using the same. To fully convey the concept of the present invention, embodiments are provided below for describing the present invention in detail. It should be noted that the terms used herein such as "select", "move" etc. for operating the blocks of the flash memory are only logical concepts. Namely, the blocks of the flash memory are only operated logically, and actual positions of the blocks are not changed.

First Embodiment

Figure 1:
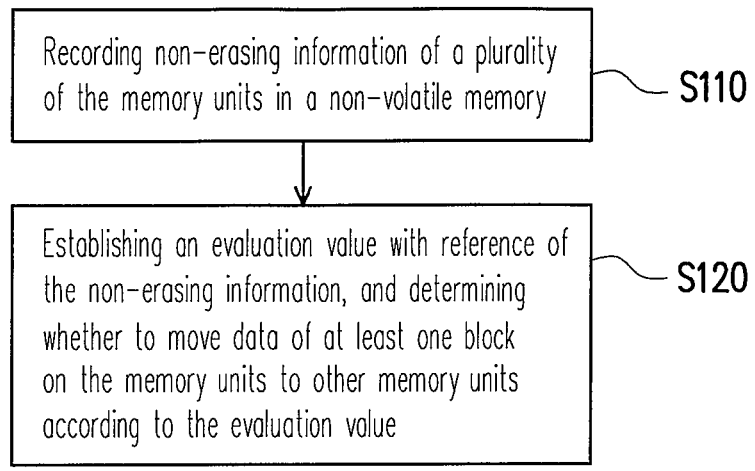
FIG. 1 is a flowchart illustrating a memory management method for a non-volatile memory according to an embodiment of the present invention.

FIG. 1 is a flowchart illustrating a memory management method for a non-volatile memory according to an embodiment of the present invention. Referring to FIG. 1, the non-volatile memory of the present embodiment is, for example, a flash memory, and is substantially divided into a plurality of blocks. A controller is used for executing wear leveling procedure, and a memory unit including at least one block is taken as an operation unit thereof, so as to reduce a possibility of data loss. The memory unit can be a single block or can be a group including a plurality of the blocks. The steps of the method are described as follows.

First, non-erasing information of a plurality of the memory units of the non-volatile memory is recorded (step S110). A table recorded with utilization state of the memory units is included within the controller, and can be used for recording the non-erasing information such as utilization sequence, corrected bit number of the ECC, reading times, utilization time, or idle time, etc. of the memory units.

For example, during data writing process, the controller may record the utilization sequence of the memory units, in which the recording method thereof is not limited. For example, the utilization sequence of each block can be recorded in detail, or a plurality of the blocks can be set as a group, and the utilization sequence of each group can be recorded, which is not limited by the present invention.

After the non-erasing information of each memory unit is obtained, the controller then establishes an evaluation value with reference of the non-erasing information, and determines whether to move data of the memory units to other memory units according to the evaluation value (step S120). The controller judges whether the non-erasing information of the memory units reaches a predetermined threshold value, if not, the non-erasing information is continually recorded, and if yes, the data of the memory units with the non-erasing information reaching the predetermined threshold value is forced to be moved to other memory units. For example, an idle time of each memory unit from a latest writing operation to the present can be calculated and compared with the predetermined threshold value so as to serve as a moving sequence for the data of the memory units, in which the method for calculating the idle time may use a table to record a writing time of each memory unit, and after a computer is rebooted or after a wear leveling procedure is activated, each of the memory units is detected, and a detecting time thereof is compared with a last writing time of each memory unit, so as to obtain the idle time of the memory unit. It should be noted that the controller may also have a table recorded with erasing times of each memory unit for being utilized in coordination with the above non-erasing information to execute the memory management method. This case will be described in detail later.

Moreover, to save a space occupied for recording the aforementioned information, in the present embodiment, the plurality of blocks can be grouped for recording. In detail, the controller may divide the blocks of the non-volatile memory into a plurality of groups, and respectively record total erasing times or the non-erasing information of all the blocks of each group. Then, when the wear leveling procedure is executed, the group is taken as the operation unit for weighting the non-erasing information or the erasing times, or the non-erasing information to the erasing times thereof to serve as the evaluation value. Another embodiment is provided in the following for detailed description.

If the writing sequence and the erasing times are taken as references for the wear leveling procedure, the writing sequence can be set based on the operation unit of groups, and the erasing times can be set based on the operation unit of blocks. Accordingly, the blocks of each group may have a common writing sequence parameter according to the writing sequence of this group within the groups of the non-volatile memory, and the blocks also have the same erasing times thereof. Therefore, the evaluation value used for determining whether to move the data of this block to the other block is obtained by weighting the writing sequence to the erasing times of this block.

According to the above method, the blocks that have not been updated for a relatively long time are selected in priority for data moving when the difference between the erasing times of the blocks in the non-volatile memory is limited, so that the possibility of instability of the data caused by not being used (written/erased) for a long time can be reduced.

Moreover, it should be noted that the ECC is used for detecting and correcting data errors of the non-volatile memory. Generally, when data of a block is read, the ECC can be applied to correct the data of the block, and the more the block is likely to be damaged, the higher possibility the ECC error is produced. Therefore, the controller of the present invention not only records the erasing times of each block, but also sets a threshold value of the corrected bit number of the ECC for reading a block, so as to prevent data loss of the block in advance. In the following, another embodiment is provided for detailed description.

Second Embodiment

Figure 2:
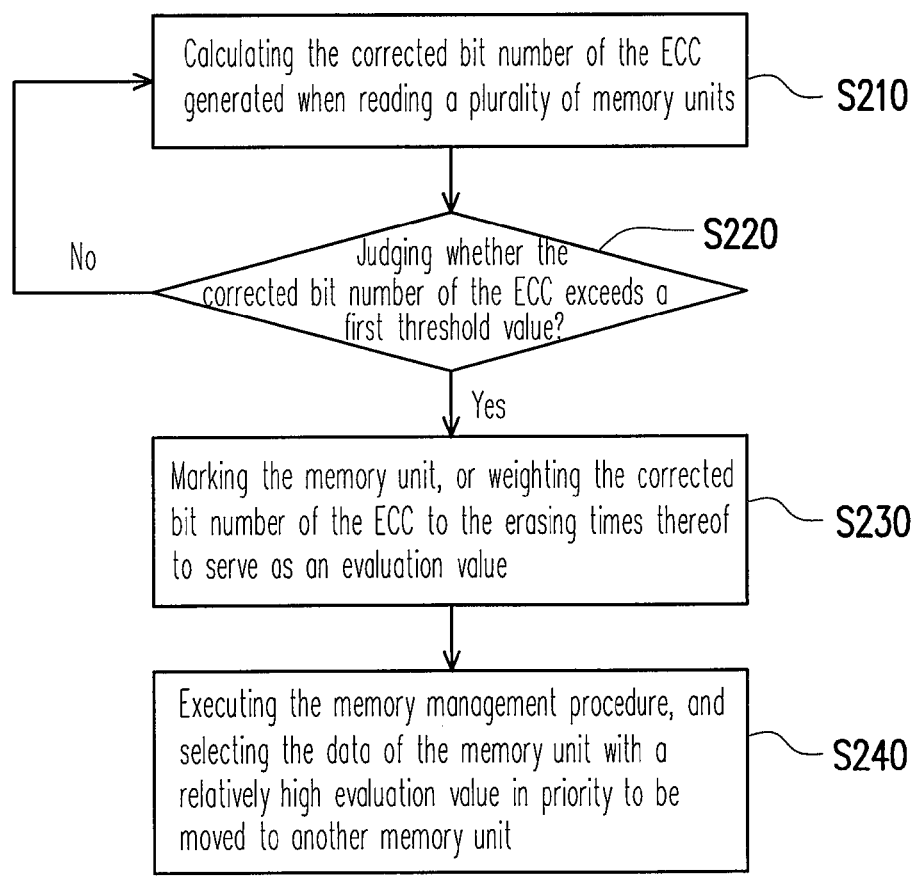
FIG. 2 is a flowchart illustrating a memory management method for a non-volatile memory according to an embodiment of the present invention.

FIG. 2 is a flowchart illustrating a memory management method for a non-volatile memory according to an embodiment of the present invention. Referring to FIG. 2, the non-volatile memory of the present embodiment is, for example, a flash memory, and is substantially divided into a plurality of blocks. A controller is used for executing the wear leveling procedure, and a memory unit including at least one block is taken as an operation unit, so as to reduce a possibility of data loss. The memory unit can be a single block or a group including a plurality of the blocks. The steps of the method are described as follows.

First, the corrected bit number of the ECC generated when a plurality of memory units are read is calculated (step S210). Next, whether the corrected bit number of the ECC exceeds a first threshold value is judged (step S220). If the corrected bit number of the ECC does not exceed the first threshold value, the corrected bit number of the ECC of the memory units are then continually calculated, and if the corrected bit number of the ECC exceeds the first threshold value, it represents data stability of such memory unit is poor, and meanwhile the memory unit is marked or the corrected bit number of the ECC is weighted to the erasing times to serve as an evaluation value (step S230). When the wear leveling procedure is executed, the data of the memory unit with a relatively high evaluation value is selected in priority and moved to another memory unit (step S240).

It should be noted that after the step S220, the controller may continually judges whether the corrected bit number of the ECC exceeds a second threshold value, and if the corrected bit number of the ECC exceeds the second threshold value, the controller is forced to execute the wear leveling procedure, and the data of the memory unit with the relatively high evaluation value is selected in priority and moved to another memory unit.

For example, assuming the non-volatile memory may correct 6 bits of error, if 3 bits of error is occurred when reading a block, the former erasing times of the read block is then multiplied by 3 or other rational numbers to serve as the evaluation value, so that this block can be selected in priority for data moving when the wear leveling procedure is executed next time. Moreover, if 5 bits of error is occurred when reading a block, then the data on the block is judged to be extremely unstable, such that the wear leveling procedure is forced to be executed, and the data on this block is exchanged in priority. Certainly, other weighting methods can also be applied, which is not limited by the present invention.

Moreover, in some special situations, after data is written into the memory, only reading of the data is performed, and writing of data is no more performed, for example, devices such as digital frames or MP3 player, etc. Data stored in such devices has a great chance to be lost due to the read disturb problem and the data retention problem. Therefore, in the present invention, whether to activate of a data updating mode (i.e. the wear leveling procedure) of the controller is determined according to the utilization (write/erase) time or reading times of the non-volatile memory. In case of such mode, the controller may perform data moving while reading data, so as to avoid the data loss. In the following, another embodiment is provided for detailed description.

Third Embodiment

Figure 3:
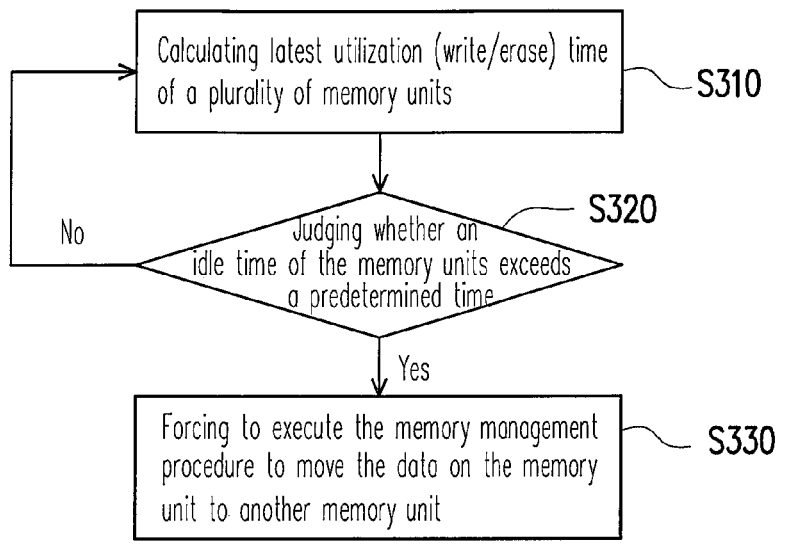
FIG. 3 is a flowchart illustrating a memory management method for a non-volatile memory according to an embodiment of the present invention.

FIG. 3 is a flowchart illustrating a memory management method for a non-volatile memory according to an embodiment of the present invention. Referring to FIG. 3, the non-volatile memory of the present embodiment is, for example, a flash memory, and is substantially divided into a plurality of blocks. A controller is used for executing a wear leveling procedure, and a memory unit including at least one block is taken as an operation unit, so as to reduce a possibility of data loss. The memory unit can be a single block or a group including a plurality of the blocks. The steps of the method are described as follows.

First, latest utilization (write/erase) time of a plurality of the memory units are calculated (step S310). Next, whether an idle time from the utilization time to the present exceeds a predetermined time is judged (step S320), in which if the idle time does not exceed the predetermined time, the utilization time is continually accumulated, and if the idle time exceeds the predetermined time, the wear leveling procedure is forced to be executed, so as to move the data on the memory unit to another memory unit (step S340). When the wear leveling procedure is executed, the utilization time of each memory unit can be weighted to the erasing times to serve as the evaluation value, so as to determine whether to move the data on the memory unit to another memory unit. The method for calculating the idle time is the same as the aforementioned description, so that detailed description thereof will not be repeated herein. It should be noted that the unit used for calculating the idle time can also be the group.

Moreover, it should be noted that the blocks of the present embodiment can be divided into a plurality of groups according to the lengths of the idle time of the memory units, and a weight value is assigned to each of the groups for weighting the erasing times thereof to serve as the evaluation value. For example, if the blocks are divided into three groups, i.e. a latest group, a normal group, and a long time unused group, and weight values 1, 2 and 3, or other rational numbers are respectively assigned to the three groups. Then, after weighting the weight values to the erasing times thereof, the long time unused group is then selected in priority for data moving, so that data loss can be avoided.

Besides the idle time is used for judgement, whether the non-volatile memory is ever power-off can also be used for determining whether to execute the wear leveling procedure. If the non-volatile memory is ever power-off, the wear leveling procedure is then forced to be executed to avoid data loss, in which whether the non-volatile memory is ever power-off can be judged by the ECC or by comparing states of a data area and a redundant area of each block within the non-volatile memory. Since the judgement method is not an essence of the present invention, detailed description thereof is omitted herein.

Moreover, it should be noted that to increase an efficiency of the controller, a depth of the register disposed therein is increased, by which the data of each block of the non-volatile memory is moved to the register in advance. Before a host instruction is received, the data in the register is moved to the other blocks, or the data of the blocks is moved to the register. In detail, if a reading is not performed by the host, or a reading speed is relatively slow, the wear leveling procedure can be executed during an idle time for waiting the host instruction, by which data of one page or a plurality of pages can be moved at a time, so that the problem of long moving time can be avoided, and the problems of read disturb and data retention occurred under special circumstances can also be resolved. However, in the present invention, the data read from the non-volatile memory are all verified by the ECC. Therefore, if the data stored in the non-volatile memory is found to have errors when being moved to the register, and the data is error corrected via the ECC and is stored in the register, the wear leveling procedure is then executed to the data stored in the register during the idle time for waiting the host instruction. It should be noted that the wear leveling procedure may also move the data stored in the non-volatile memory directly.

Figure 4:
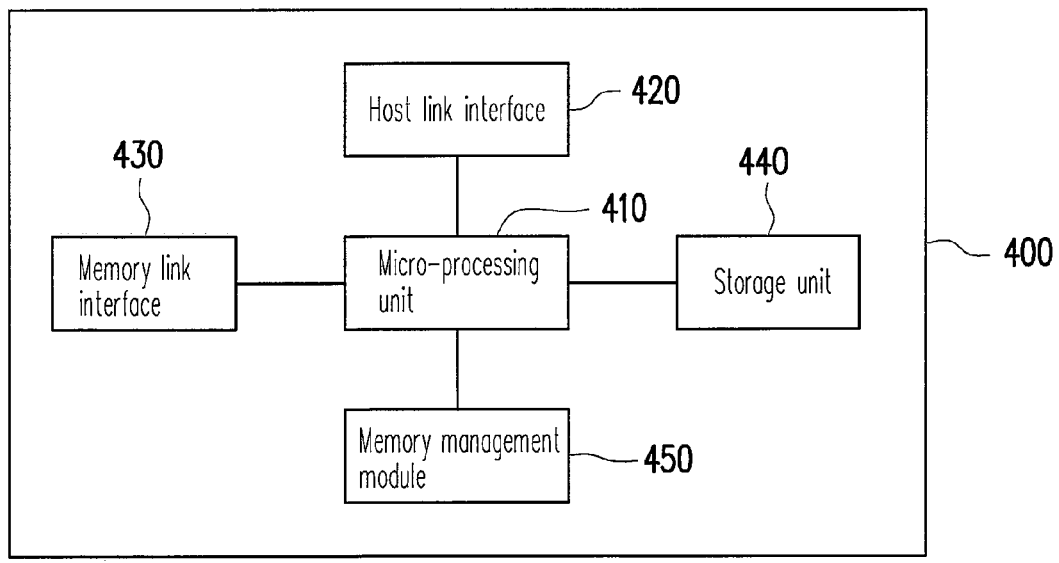
FIG. 4 is a block diagram illustrating a controller according to an embodiment of the present invention.

Based on the aforementioned memory management method for the non-volatile memory, the present invention further provides a controller to execute the above mentioned memory management method. FIG. 4 is a block diagram illustrating a controller according to an embodiment of the present invention. Referring to FIG. 4, the controller 400 of the present embodiment is used for executing a wear leveling procedure to a non-volatile memory, so as to reduce a possibility of data loss. The controller 400 includes a micro-processing unit 410, a host link interface 420, a memory link interface 430, a storage unit 440 and a memory management module 450. The non-volatile memory is, for example, a flash memory, and is substantially divided into a plurality of blocks.

The micro-processing unit 410 is, for example, a microprocessor used for controlling whole operations of the controller 400. The host link interface 420 provides an interface for connecting the controller 400 to an external host (not shown), and the memory link interface 430 is coupled to the micro-processing unit 410 for connecting the controller 400 to an external non-volatile memory (not shown).

The storage unit 440 is connected to the micro-processing unit 410 for temporarily storing data of each block of the non-volatile memory, and moving the data of the memory units to other memory units before the micro-processing unit 410 receives the host instruction.

The memory management module 450 is connected to the micro-processing unit 410 for performing the wear leveling procedure to the non-volatile memory via the micro-processing unit 410. In detail, the memory management module 450 may record erasing times and non-erasing information of a plurality of memory units in the non-volatile memory, in which the memory units include at least one block. The non-erasing information of each memory unit or the non-erasing information weighting the erasing times can be used as a reference for establishing an evaluation value, and whether to move data of at least one block on the memory units to another memory unit is determined according to the evaluation value. The flow of the memory management method has been described in the above embodiment, and therefore detailed description thereof will not be repeated herein.

In summary, according to the memory management method for the non-volatile memory and the controller using the same of the present invention, by recording the non-erasing information of a plurality of memory units, and adding it to the data moving judgement criteria, data loss of the blocks due to the blocks being not written for a long time can be avoided. Moreover, whether the wear leveling procedure is forced to be executed is determined by the corrected bit number of the ECC generated during data reading, and when the wear leveling procedure is executed, the corrected bit number of the ECC is weighted to the erasing times, so as to select the blocks with unstable data in priority for data moving, so that the problems of read disturb and data retention caused by excessive reading times can be resolved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory management method for a non-volatile memory, wherein the non-volatile memory is divided into a plurality of blocks, the memory management method comprising:

(a) recording each corrected bit number of an error correction code (ECC) of a plurality of memory units, wherein each of the memory units comprises at least one block; and (b) establishing an evaluation value, and determining whether to move data of at least one block on the memory units to another memory unit according to the evaluation value;

wherein the step (b) comprises:

calculating the corrected bit number of an error correction code (ECC) generated when each of the blocks is read, and the calculation result serves as the evaluation value;

judging whether the evaluation value exceeds a threshold value; and marking or weighting the corresponding block if the evaluation value exceeds the threshold value, and selecting the block in priority for data moving, wherein in the step (b), corrected bit number of the ECC of the blocks of the memory units is weighted to erasing times of the memory units to serve as the evaluation value.

2. The memory management method for a non-volatile memory as claimed in claim 1, wherein the memory unit is a single block.

3. The memory management method for a non-volatile memory as claimed in claim 2 further comprising:

copying data of the blocks to a register; and copying the data from the register to other blocks before a host instruction is received.

4. The memory management method for a non-volatile memory as claimed in claim 2 further comprising:

copying data of the blocks to a register; and copying the data of the blocks from original blocks to other blocks before a host instruction is received.

5. The memory management method for a non-volatile memory as claimed in claim 1, wherein if the evaluation value reaches the threshold value, data on the memory units is forced to be moved to another memory unit.

6. The memory management method for a non-volatile memory as claimed in claim 1, wherein the memory units are a plurality of groups and each of the groups contains a plurality of the blocks.

7. The memory management method for a non-volatile memory as claimed in claim 1, wherein the step (b) is executed when the non-volatile memory is judged to be ever power-off.

8. The memory management method for a non-volatile memory as claimed in claim 1, wherein the non-volatile memory comprises a flash memory.

9. The memory management method for a non-volatile memory as claimed in claim 1, wherein if the evaluation value reaches the threshold value, selecting the corresponding block in priority for data moving when data of the blocks are being moved next time.

10. A controller, comprising:

a micro-processing unit, for controlling whole operations of the controller;

a host link interface, coupled to a host and the micro-processing unit;

a memory link interface, coupled to a non-volatile memory and the micro-processing unit, wherein the non-volatile memory is divided into a plurality of blocks; and a memory management module, coupled to the micro-processing unit for executing a wear leveling procedure to the non-volatile memory via the micro-processing unit, wherein the memory management module records each corrected bit number of an error correction code (ECC) of a plurality of memory units within the non-volatile memory that each of the memory units comprises at least one block, establishes an evaluation value, and determines whether to move data of at least one block on the memory units to another memory unit according to the evaluation value;

wherein when establishing the evaluation value and determining whether to move data of the at least one block on the memory units to another memory unit according to the evaluation value, the memory management module calculates the corrected bit number of an error correction code generated when each of the blocks is read, and the calculation result serves as the evaluation value; the memory management module judges whether the evaluation value exceeds a threshold value; and the memory management module marks or weights the corresponding block if the evaluation value exceeds the threshold value, and selects the block in priority for data moving, wherein the step (b) is executed when the non-volatile memory is judged to be ever power-off.

11. The controller as claimed in claim 10 further comprising:

a storage unit, for temporarily storing data of the blocks, and moving data of the memory units to another memory unit before receiving a host instruction.

12. The controller as claimed in claim 10, wherein the memory unit is a single block.

13. The controller as claimed in claim 12, wherein the memory management module takes the corrected bit number of the ECC of the blocks of the memory units weighting erasing times of the memory units as the evaluation value.

14. The controller as claimed in claim 10, wherein the memory units are a plurality of groups and each of the groups contains a plurality of the blocks.

15. The controller as claimed in claim 10, wherein when the evaluation value reaches the threshold value, data on the memory units is forced to be moved to another memory unit.

16. The controller as claimed in claim 10, wherein if the evaluation value exceeds the threshold value, the memory management module marks or weights the corresponding block and selects the block in priority for data moving when data of the blocks are being moved next time.

* * * * *